United States Patent
Li et al.

(10) Patent No.: US 11,777,134 B2
(45) Date of Patent: *Oct. 3, 2023

(54) SECONDARY BATTERY AND DEVICE INCLUDING THE SAME

(71) Applicant: CONTEMPORARY AMPEREX TECHNOLOGY CO., LIMITED, Ningde (CN)

(72) Inventors: Liye Li, Ningde (CN); Zeli Wu, Ningde (CN); Changlong Han, Ningde (CN); Chenghua Fu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 43 days.

This patent is subject to a terminal disclaimer.

(21) Appl. No.: 17/516,504

(22) Filed: Nov. 1, 2021

(65) Prior Publication Data

US 2022/0059867 A1    Feb. 24, 2022

Related U.S. Application Data

(63) Continuation of application No. PCT/CN2019/127971, filed on Dec. 24, 2019.

(51) Int. Cl.

| | |
|---|---|
| H01M 10/0525 | (2010.01) |
| H01M 4/04 | (2006.01) |
| H01M 4/131 | (2010.01) |
| H01M 4/38 | (2006.01) |
| H01M 4/505 | (2010.01) |
| H01M 4/525 | (2010.01) |
| H01M 4/583 | (2010.01) |
| H01M 10/0568 | (2010.01) |
| H01M 10/0569 | (2010.01) |
| H01M 4/02 | (2006.01) |

(52) U.S. Cl.
CPC ..... *H01M 10/0525* (2013.01); *H01M 4/0404* (2013.01); *H01M 4/131* (2013.01); *H01M 4/386* (2013.01); *H01M 4/505* (2013.01); *H01M 4/525* (2013.01); *H01M 4/583* (2013.01); *H01M 10/0568* (2013.01); *H01M 10/0569* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2009/0253044 A1 | 10/2009 | Nogi et al. | |
| 2015/0295216 A1* | 10/2015 | Okuno | H02J 7/0068 |
| | | | 320/128 |
| 2015/0380768 A1* | 12/2015 | Mizuno | H01M 10/0569 |
| | | | 429/338 |
| 2018/0048020 A1* | 2/2018 | Zou | H01M 4/364 |

FOREIGN PATENT DOCUMENTS

| | | |
|---|---|---|
| CN | 101826637 A | 9/2010 |
| CN | 105261790 A | 1/2016 |
| CN | 103413970 B | 6/2016 |
| CN | 105826604 A | 8/2016 |
| CN | 106099174 A | 11/2016 |
| CN | 107634263 A | 1/2018 |
| CN | 109244530 A | 1/2019 |
| CN | 110391414 A | 10/2019 |
| JP | 2009-134943 A | 6/2009 |
| JP | 2013225388 A | 10/2013 |
| JP | 2017-084820 A | 5/2017 |
| JP | 2017-228426 A | 12/2017 |
| WO | 2014/147983 A1 | 9/2014 |
| WO | 2015/129187 A1 | 9/2015 |

OTHER PUBLICATIONS

Y.-X. Wang, S.-L. Chou, J. H. Kim, H.-K. Liu, S.-X. Dou. Nanocomposites of silicon and carbon derived from coal tar pitch: Cheap anode materials for lithium-ion batteries with long cycle life and enhanced capacity, Electrochimica Acta 93 (2013) 213-221.*
International Search Report and Written Opinion, PCT/CN2019/127971, dated Sep. 15, 2020, 9 pgs.
Contemporary Amperex Technology Co., Limited, Extended European Search Report, EP 19957179.5, dated Apr. 4, 2022, 9 pgs.
Contemporary Amperex Technology Co., Limited, Examination Report, IN202217017562, dated Jul. 29, 2022, 6 pgs.
Japanese Office Action dated May 29, 2023 in Japanese Patent Application No. 2022-521985 with computer-generated English translation, 13 pages.

* cited by examiner

*Primary Examiner* — Carlos Barcena
(74) *Attorney, Agent, or Firm* — XSENSUS LLP

(57) ABSTRACT

The application provides a secondary battery and a device including the same. The second battery includes: a negative electrode plate, the negative electrode plate including a negative active material; a separation film, the separation film including a base material and a coating arranged on at least one surface of the base material; and an electrolyte, the electrolyte including an organic solvent, where the negative active material includes a silicon-based material and a carbon material; thickness of the base material of the separation film is 7 μm~12 μm; and the organic solvent includes ethylene carbonate, and a weight ratio of the ethylene carbonate in the organic solvent is ≤20%. The secondary battery and the device including the same, which are provided by the application, in the premise of having high energy density, can also have good high-temperature cycle performance, good high-temperature storage performance, and low low-temperature direct current resistance.

14 Claims, 3 Drawing Sheets

SECONDARY BATTERY AND DEVICE INCLUDING THE SAME

CROSS-REFERENCE TO RELATED APPLICATIONS

This application is a continuation application of PCT Patent Application No. PCT/CN2019/127971, entitled "Secondary battery and device comprising the secondary battery" filed on Dec. 24, 2019, which is incorporated herein by reference in its entirety.

TECHNICAL FIELD

The application relates to the technical field of batteries, in particular to a secondary battery and a device including the same.

BACKGROUND

Large consumption of fossil resources results in increasing resource depletion, and meanwhile, the serious environment problems caused by fossil resources in their using process also lead to increasingly urgent demands for novel clean and environment-friendly new energy. Wind energy, hydraulic energy, solar energy, and the like in existing new energy are developed and applied to different degrees, but cannot be continuously and stably supplied due to factors of season, geography, and the like, and proper energy storage equipment is required to store and release electric energy. Secondary batteries are under rapid development thanks to advantages such as accessible raw materials, and environmental-friendliness, and therefore secondary batteries have been widely applied in the new energy industry.

However, secondary batteries that are commercially available are not enough to meet actual use demands, and thus, it is urgent to develop a secondary battery which can simultaneously give consideration to both a high energy density and good electrochemical performance.

SUMMARY

In view of the problems in the background art, the application aims to provide a secondary battery and a device including the same. In the premise of having a high energy density, the secondary battery also can simultaneously give consideration to good high-temperature cycle performance, good high-temperature storage performance and low low-temperature direct current resistance.

In order to fulfill the aim above, in a first aspect, the application provides a secondary battery, including: a negative electrode plate, the negative electrode plate including a negative current collector and a negative electrode film which is arranged on at least one surface of the negative current collector and includes a negative active material; a separation film, the separation film including a base material and a coating arranged on at least one surface of the base material; and an electrolyte, the electrolyte including an organic solvent, wherein the negative active material includes a silicon-based material and a carbon material; thickness of the base material of the separation film is 7 μm~12 μm; and the organic solvent includes ethylene carbonate (EC), and a weight ratio of the ethylene carbonate (EC) in the organic solvent is ≤20%.

In some embodiments, the weight ratio of the ethylene carbonate (EC) in the organic solvent is ≤15%; and preferably, the weight ratio of the ethylene carbonate (EC) in the organic solvent is ≤10%.

In some embodiments, the thickness of the base material of the separation film is 7 μm~10 μm.

In some embodiments, a porosity of the separation film is 25%~50%; and preferably, the porosity of the separation film is 30%~48%.

In some embodiments, the organic solvent further includes one or more of ethyl methyl carbonate (EMC), diethyl carbonate (DEC), and dimethyl carbonate (DMC).

In some embodiments, a weight ratio of the ethyl methyl carbonate (EMC) in the organic solvent is 60%~95%; and preferably, the weight ratio of the ethyl methyl carbonate (EMC) in the organic solvent is 75%~95%.

In some embodiments, a weight ratio of the diethyl carbonate (DEC) in the organic solvent is ≤30%; and preferably, the weight ratio of the diethyl carbonate (DEC) in the organic solvent is ≤20%.

In some embodiments, a weight ratio of the dimethyl carbonate (DMC) in the organic solvent is ≤15%; and preferably, the weight ratio of the dimethyl carbonate (DMC) in the organic solvent is ≤10%.

In some embodiments, the electrolyte further includes electrolyte salt, and the electrolyte salt includes lithium bisfluorosulfonimide (LiFSI) and lithium hexafluorophosphate ($LiPF_6$); and molarity of the lithium bisfluorosulfonimide (LiFSI) in the electrolyte is 0.8 mol/L~1.3 mol/L, and molarity of the lithium hexafluorophosphate ($LiPF_6$) in the electrolyte is 0.15 mol/L~0.4 mol/L.

In some embodiments, the molarity of the lithium bisfluorosulfonimide (LiFSI) in the electrolyte is 0.9 mol/L~1.2 mol/L, and the molarity of the lithium hexafluorophosphate ($LiPF_6$) in the electrolyte is 0.15 mol/L~0.3 mol/L.

In some embodiments, the electrical conductivity of the electrolyte at 25° C. is 6.5 mS/cm~9.5 mS/cm, and preferably, the electrical conductivity of the electrolyte at 25° C. is 7 mS/cm~9 mS/cm; and/or a viscosity of the electrolyte at 25° C. is 3.5 mPa·s~5.5 mPa·s, and preferably, the viscosity of the electrolyte at 25° C. is 4 mPa·s~5 mPa·s.

In some embodiments, the silicon-based material includes one or more of a silicon simple substance, silicon alloy, a silicon oxygen compound, a silicon carbon compound, and a silicon nitrogen compound, and preferably, the silicon-based material includes the silicon oxygen compound; and/or the carbon material includes one or more of graphite, soft carbon, and hard carbon, preferably, the carbon material includes the graphite, and the graphite is selected from one or more of artificial graphite and natural graphite.

In some embodiments, a mass ratio of the silicon-based material in the negative active material is ≤50%, and preferably, is 15%~30%.

In some embodiments, a thickness of the separation film is 11 μm~16 μm, and preferably, the thickness of the separation film is 12 μm~14 μm.

In some embodiments, the secondary battery includes a positive electrode plate, the positive electrode plate including a positive current collector and a positive electrode film which is arranged on at least one surface of the positive current collector and includes a positive active material, the positive active material including one or more of a lithium nickel cobalt manganese oxygen compound and a lithium nickel cobalt aluminum oxide, and preferably, the positive active material including one or more of $Li_aNi_bCo_cM_dM'_eO_fA_g$ or $Li_aNi_bCo_cM_dM'_eO_fA_g$ with a coating layer on at least one part of the surface, wherein $0.8 \leq a \leq 1.2$, $0.5 \leq b<1$, $0<c<1$, $0<d<1$, $0\leq e\leq 0.1$, $1\leq f\leq 2$, and $0\leq g\leq 1$, M is selected from one or more of Mn and Al, M' is selected from one or more of Zr, Al, Zn, Cu, Cr, Mg, Fe, V, Ti, and B, and A is selected from one or more of N, F, S, and Cl.

In a second aspect, the application provides a device, and the device includes the secondary battery according to the first aspect of the application.

The application at least has the following beneficial effects that:

The secondary battery provided by the application includes: a negative electrode including the specific active material, the separation film including the base material with the specific thickness, and the electrolyte including the specific organic solvent. Under the combined action of the negative electrode, the separation film, and the electrolyte, the secondary battery provided by the application, in the premise of having high energy density, also have good high-temperature cycle performance, good high-temperature storage performance, and low low-temperature direct current resistance. The device provided by the application in the second aspect includes the secondary battery provided by the application in the first aspect, and thus at least has the same advantages with the secondary battery.

Figure 1:
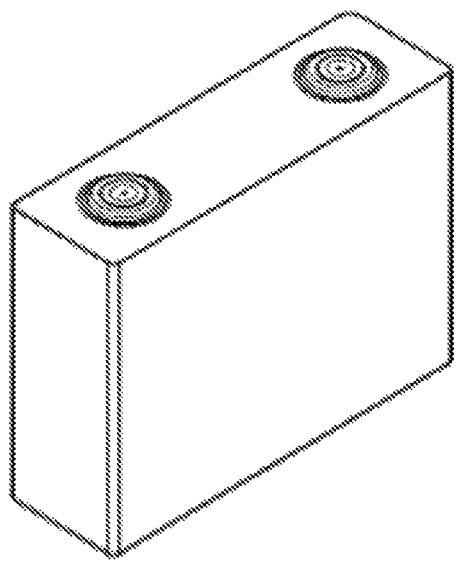
FIG. 1 is a schematic diagram of a secondary battery provided by an embodiment of the application.

Where, reference signs are illustrated as follows:
1. battery box;
2. upper box body;
3. lower box body;
4. battery module; and
5. secondary battery.

DETAILED DESCRIPTION

A secondary battery and a device including the same according to the application will be illustrated in detail below.

Firstly, the secondary battery according to a first aspect of the application will be illustrated.

The secondary battery according to the first aspect of the application includes a negative electrode plate, a separation film, and an electrolyte. The negative electrode plate includes a negative current collector and a negative electrode film which is arranged on at least one surface of the negative current collector and includes a negative active material; the separation film includes a base material and a coating arranged on at least one surface of the base material; and the electrolyte includes an organic solvent, wherein the negative active material includes a silicon-based material and a carbon material, thickness of the base material of the separation film is 7 μm~12 μm, the organic solvent includes ethylene carbonate (EC), and a weight ratio of the ethylene carbonate (EC) in the organic solvent is ≤20%.

In the secondary battery according to the application, the silicon-based material has relatively high theoretical specific capacity and can obviously increase capacity of the secondary battery when being used as the negative active material of the secondary battery, but the volume of the silicon-based material can be seriously expanded in the charging and discharging process so as to influence performance of the secondary battery; and the silicon-based material and the carbon material are combined for use to form the negative active material, so that in one aspect, the capacity of the secondary battery can be expanded, and in the other aspect, addition of the carbon material can also relieve influence of volume expansion of the silicon-based material on performance of the secondary battery to a certain degree. Meanwhile, in the secondary battery provided by the application, the organic solvent in the electrolyte includes the ethylene carbonate (EC), and the weight ratio of the ethylene carbonate (EC) in the organic solvent is ≤20%, so that the risk of battery gas production can be effectively reduced; and meanwhile, the inventors have found by research that combined use of the ethylene carbonate (EC) with the specific content and the separation film base material with the specific thickness can enable the electrolyte to be well wet in the separation film so as to effectively improve power performance and cycle performance of the battery.

In the secondary battery according to the first aspect of the application, preferably, the thickness of the base material of the separation film is 7 μm~10 μm.

In the secondary battery according to the first aspect of the application, preferably, a porosity of the separation film is 25%~50%. If the porosity of the separation film is excessively low, a path for lithium ions to pass through is relatively long, which is likely to influence the dynamics performance of the secondary battery; and if the porosity of the separation film is excessively high, it may reduce the mechanical strength of the separation film, leaving large potential safety hazards to the secondary battery. More preferably, the porosity of the separation film is 30%~48%.

In the secondary battery according to the first aspect of the application, in the separation film, the base material can be selected from one or more of a polyethylene film, a polypropylene film, a polyvinylidene fluoride film, and their multi-layer composite film.

In the secondary battery according to the first aspect of the application, in the separation film, the coating arranged on at least one surface of the base material may include one or more of an inorganic particle coating or a polymer coating, and types of the inorganic particle coating and the polymer coating are not specially limited and can be selected as actually required. Specifically, the inorganic particle coating may include one or more of aluminum oxide particles and zirconium oxide particles, and the polymer coating may include one or more of a polyvinylidene fluoride polymer and a polyimide polymer.

In the secondary battery according to the first aspect of the application, preferably, thickness of the separation film (i.e., sum of thickness of the base material and thickness of the coating in the separation film) is 10 μm~16 μm; and further preferably, the thickness of the separation film is 12 μm~14 μm.

In the secondary battery according to the first aspect of the application, preferably, the weight ratio of the ethylene carbonate (EC) in the organic solvent is ≤15%; and more preferably, the weight ratio of the ethylene carbonate (EC) in the organic solvent is ≤10%.

In the secondary battery according to the first aspect of the application, the organic solvent further includes one or more of ethyl methyl carbonate (EMC), diethyl carbonate (DEC), and dimethyl carbonate (DMC).

In the secondary battery according to the first aspect of the application, when the organic solvent further includes the EMC, preferably, a weight ratio of the EMC in the organic solvent is 60%~95%, and more preferably, the weight ratio of the EMC in the organic solvent is 75%~95%.

In the secondary battery according to the first aspect of the application, when the organic solvent further includes the DEC, preferably, a weight ratio of the DEC in the organic solvent is ≤30%, and more preferably, the weight ratio of the DEC in the organic solvent is ≤20%.

In the secondary battery according to the first aspect of the application, when the organic solvent further includes the DMC, preferably, a weight ratio of the DMC in the organic solvent is ≤15%, and more preferably, the weight ratio of the DMC in the organic solvent is ≤10%.

In the secondary battery according to the first aspect of the application, the organic solvent further can include one or more of methyl formate, ethyl formate, methyl acetate, ethyl acetate, propyl acetate, methyl propionate, ethyl propionate, propyl propionate, buty propionate, isobutyl propionate, amyl propionate, isoamyl propionate, ethyl isopropylate, ethyl butyrate, ethyl isobutyrate, butyl butyrate, butyl isobutyrate, amyl butyrate, isoamyl butyrate, ethyl valerate, ethyl isovalerate, propyl valerate, propyl isovalerate, and compounds obtained after the compounds above are partially substituted or all substituted by one or more of halogen atoms.

In the secondary battery according to the first aspect of the application, the electrolyte further includes electrolyte salt, and the electrolyte salt can include one or more of lithium bisfluorosulfonimide (LiFSI) and lithium hexafluorophosphate (LiPF$_6$); and preferably, the electrolyte salt includes the lithium bisfluorosulfonimide (LiFSI) and lithium hexafluorophosphate (LiPF$_6$), molarity of the lithium bisfluorosulfonimide (LiFSI) in the electrolyte is 0.8 mol/L~1.3 mol/L, and molarity of the lithium hexafluorophosphate (LiPF$_6$) in the electrolyte is 0.15 mol/L~0.4 mol/L.

When content of the lithium bisfluorosulfonimide (LiFSI) and lithium hexafluorophosphate (LiPF$_6$) is within the range above, not only can oxidization of the lithium bisfluorosulfonimide (LiFSI) at a positive electrode be relieved and cycle performance of the battery is improved, but also low-temperature power performance of the battery can be effectively improved.

In the secondary battery according to the first aspect of the application, further preferably, the molarity of the lithium bisfluorosulfonimide (LiFSI) in the electrolyte is 0.9 mol/L~1.2 mol/L.

In the secondary battery according to the first aspect of the application, further preferably, the molarity of the lithium hexafluorophosphate (LiPF$_6$) in the electrolyte is 0.15 mol/L~0.3 mol/L.

In the secondary battery according to the first aspect of the application, electrical conductivity of the electrolyte at 25° C. is 6.5 mS/cm~9.5 mS/cm; and preferably, the electrical conductivity of the electrolyte at 25° C. is 7 mS/cm~9 mS/cm.

In the secondary battery according to the application, a viscosity of the electrolyte at 25° C. is 3.5 mPa·s~5.5 mPa·s; and preferably, the viscosity of the electrolyte at 25° C. is 4 mPa·s~5 mPa·s.

The electrical conductivity of the electrolyte at 25° C. can be tested by the method well known in the art, and an adopted test instrument may be a Rex electrical conductivity equipment instrument.

The viscosity of the electrolyte at 25° C. can be tested by the method well known in the art, and an adopted test instrument may be a viscometer.

In the secondary battery according to the first aspect of the application, the electrolyte further includes an additive, and the additive may include one or more of vinylene carbonate, fluoroethylene carbonate (FEC), 1,3-propane suhone, 1,3-propanedisulfonic anhydride (PDSA), ethylene sulfate, succinic anhydride (SA), tris(trimethylsilane) phosphate (TMSP), trifluoromethanesulfonic anhydride, tetrafluorosuccinic anhydride, and adiponitrile.

In the secondary battery according to the first aspect of the application, preferably, the silicon-based material includes one or more of a silicon simple substance, silicon alloy, a silicon oxygen compound, a silicon carbon compound, and a silicon nitrogen compound; and more preferably, the silicon-based material includes the silicon oxygen compound.

In the secondary battery according to the first aspect of the application, preferably, a mass ratio of the silicon-based material in the negative active material is ≤50%, and more preferably, is 15%~30%.

In the secondary battery according to the first aspect of the application, preferably, the carbon material includes one or more of graphite, soft carbon, and hard carbon; and more preferably, the carbon material includes the graphite, and the graphite is selected from one or more of artificial graphite and natural graphite.

The secondary battery according to the first aspect of the application further includes a positive electrode plate, the positive electrode plate including a positive current collector and a positive electrode film which is arranged on at least one surface of the positive current collector and includes a positive active material; the positive electrode film may be arranged on one surface of the positive current collector, or may be simultaneously arranged on two surfaces of the positive current collector; and the negative electrode film may be arranged on one surface of the negative current collector, or may be simultaneously arranged on two surfaces of the negative current collector.

In the secondary battery according to the first aspect of the application, preferably, the positive active material includes one or more of a lithium nickel cobalt manganese oxygen compound and a lithium nickel cobalt aluminum oxide. The lithium nickel cobalt manganese oxygen compound and the lithium nickel cobalt aluminum oxide, as the positive active materials of the secondary battery, have advantages of high specific capacity, long cycle life, and the like, and are matched with the negative active material including the silicon-based material for use so as to further improve electrochemical performance of the battery.

In the secondary battery according to the first aspect of the application, preferably, the positive active material includes one or more of a material with a general formula of $Li_aNi_bCo_cM_dM'_eO_fA_g$ or $Li_aNi_bCo_cM_dM'_eO_fA_g$ with a coating layer on at least one part of the surface, wherein 0.8≤a≤1.2, 0.5≤b<1, 0<c<1, 0<d<1, 0≤e≤0.1, 1≤f≤2, and 0≤g≤1, M is selected from one or more of Mn and Al, M' is selected from one or more of Zr, Al, Zn, Cu, Cr, Mg, Fe, V, Ti, and B, and A is selected from one or more of N, F, S, and Cl.

The coating layer on the surface of the positive active material may be a carbon layer, an oxide layer, an inorganic salt layer or a conductive macromolecule layer. Coating modification on the surface of the positive active material can further improve the cycle performance of the secondary battery.

In the secondary battery according to the first aspect of the application, further, the positive active material further may include one or more of a lithium nickel oxide (e.g., lithium nickelate), a lithium manganese oxide (e.g., spinel type lithium manganate and layer structure lithium manganate), lithium iron phosphate, lithium manganese phosphate, lithium manganese iron phosphate, lithium cobaltate, and their modified compounds.

In the secondary battery according to the first aspect of the application, type of the positive current collector is not specifically limited, and can be selected as actually required. Specifically, the positive current collector can be selected from a metal foil, e.g., an aluminum foil.

In the secondary battery according to the first aspect of the application, type of the negative current collector is not specially limited, and can be selected as actually required. Specifically, the negative current collector can be selected from a metal foil, e.g., a copper foil.

In some embodiments, the secondary battery may include an outer package for packaging the positive electrode plate, the negative electrode plate, and the electrolyte. As an example, the positive electrode plate, the negative electrode plate and the separation film can be formed into an electrode assembly with a laminated structure or an electrode assembly with a wound structure by lamination or winding, and the electrode assembly is packaged in the outer package; and the electrolyte wets the electrode assembly. The number of the electrode assembly in the secondary battery may be one or more, and can be regulated as required.

In some embodiments, the outer package of the secondary battery may be a soft package, e.g., a bag-type soft package. Material of the soft package may be plastics, and for example, may include one or more of polypropylene (PP), polybutylene terephthalate (PBT), poly butylene succinate (PBS) and the like. The outer package of the secondary battery may also be a hard housing, e.g., an aluminum housing and the like.

The application does not make any special limit to the shape of the secondary battery, and the secondary battery may be of a cylinder shape, a square shape or other random shapes. FIG. 1 shows a secondary battery 5 with a square structure as an example.

In some embodiments, the secondary battery can be assembled into a battery module, the battery module may include a plurality of secondary batteries, and the specific number of the secondary batteries may be regulated according to application and capacity of the battery module.

Figure 2:
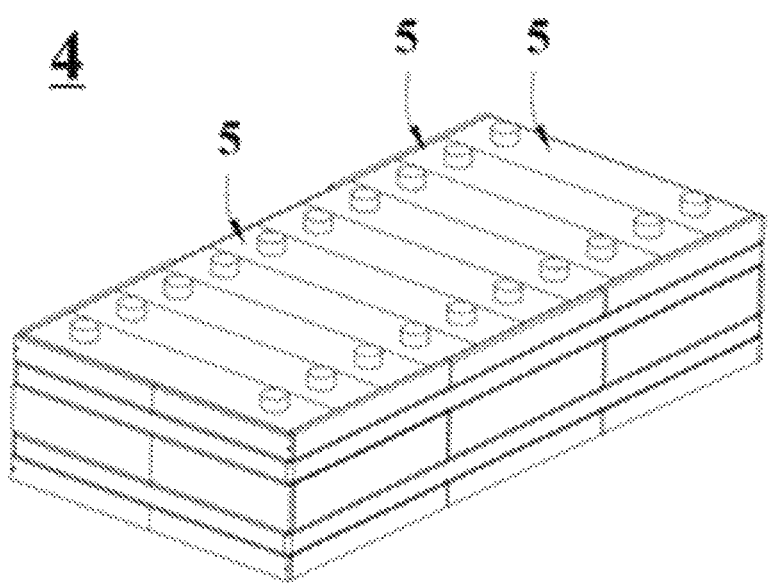
FIG. 2 is a schematic diagram of a battery module provided by an embodiment of the application.

FIG. 2 is a battery module 4 as an example. With reference to FIG. 2, in the battery module 4, a plurality of secondary batteries 5 may be sequentially arranged along length direction of the battery module 4. Certainly, the secondary batteries 5 also may be arranged in other random manners. Further, the plurality of secondary batteries 5 can be fixed by fasteners.

In some embodiments, the battery module 4 further can include a housing with an accommodation space, and the plurality of secondary batteries 5 are accommodated in the accommodation space.

In some embodiments, the battery module further can be assembled into a battery pack, and the number of the battery modules included in the battery pack can be regulated according to application and capacity of the battery pack.

Figure 3:
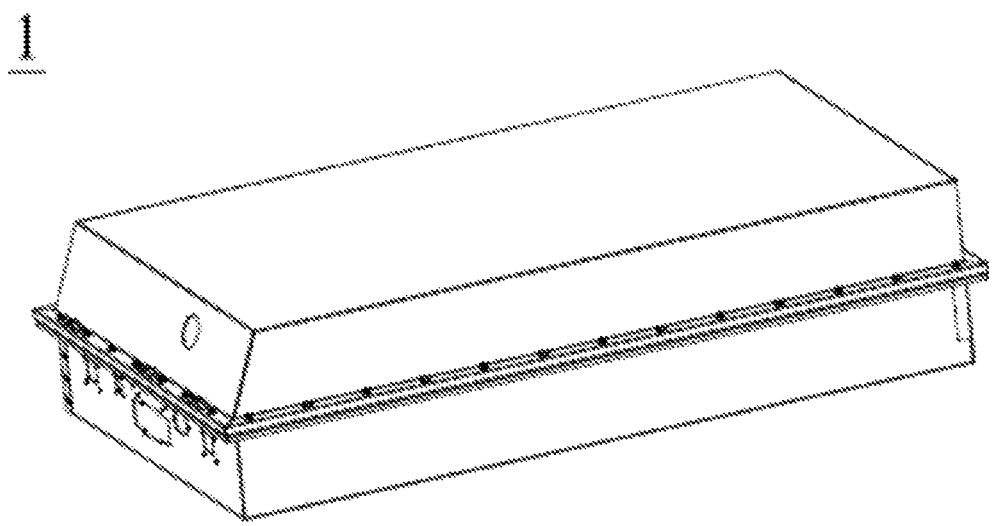
FIG. 3 is a schematic diagram of a battery pack provided by an embodiment of the application.
Figure 4:
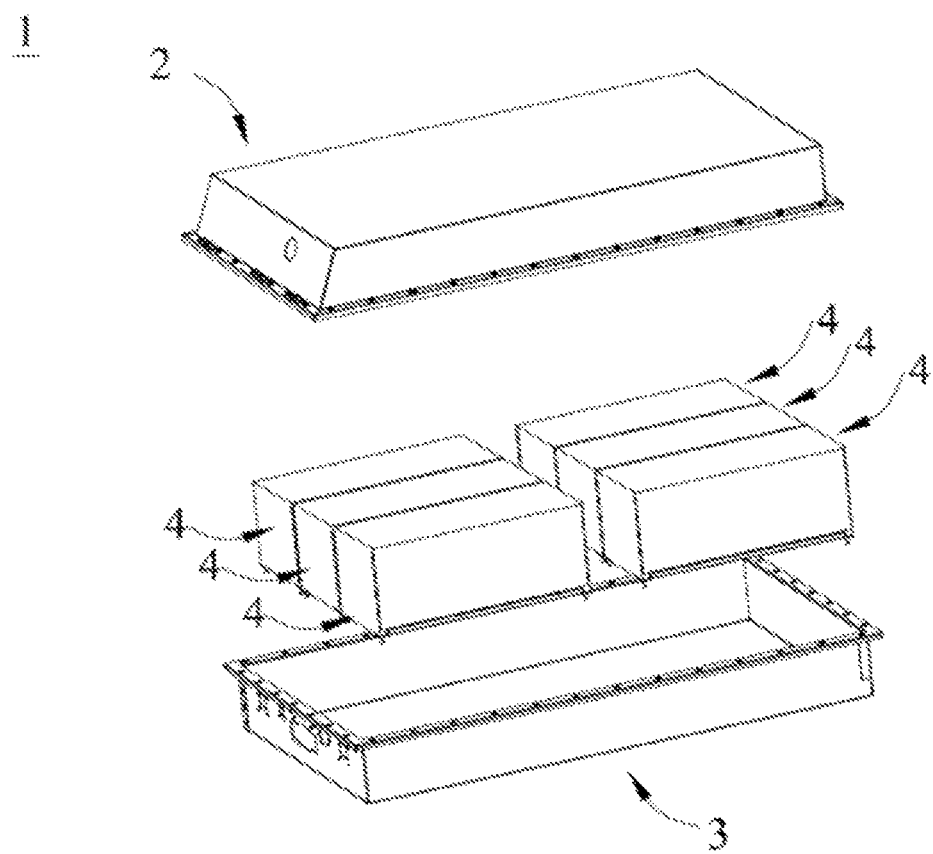
FIG. 4 is an exploded view of FIG. 3.

FIG. 3 and FIG. 4 show a battery pack 2 as an example. With reference to FIG. 3 and FIG. 4, the battery pack 1 may include a battery box and a plurality of battery modules 4 arranged in the battery box. The battery box includes an upper box body 2 and a lower box body 3, the upper box body 2 can be covered on the lower box body 3, and an enclosed space for accommodating the battery modules 4 is formed. The plurality of battery modules 4 can be arranged in the battery box in a random manner.

Secondly, the device according to a second aspect of the application will be illustrated.

The application provides a device in the second aspect. The device includes the secondary battery provided by the application in the first aspect, and the secondary battery can be used as a power supply of the device, or can be used as an energy storage unit of the device. The device includes, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf cart, an electric truck, and the like), an electric train, a ship, a satellite, an energy storage system, and the like.

The device may select the secondary battery, the battery module or the battery pack according to use demands of the device.

Figure 5:
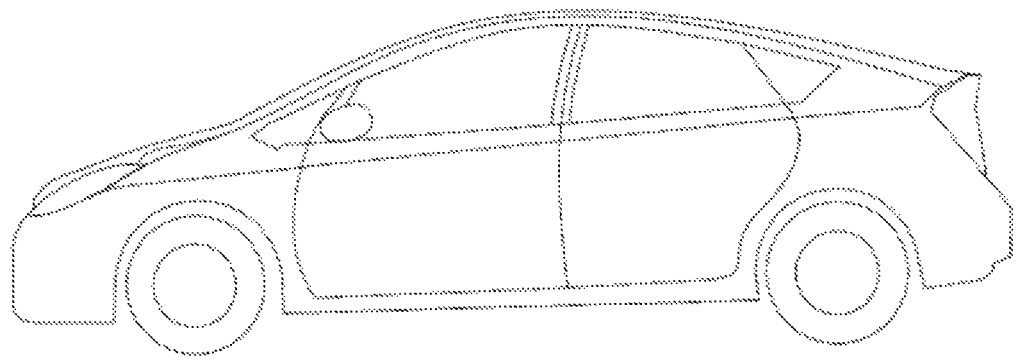
FIG. 5 is a schematic diagram of a device provided by an embodiment of the application.

FIG. 5 shows a device as an example. The device is a pure electric vehicle, a hybrid electric vehicle, a plug-in hybrid electric vehicle or the like. In order to meet demands of the device for high power and a high energy density of the secondary battery, the battery pack or the battery module can be adopted.

A device as another example may be a mobile phone, a tablet personal computer, a notebook computer, and the like. The device is usually required to be thin and light, and can use the secondary battery as a power supply.

The application will be further illustrated below in combination of embodiments. It should be understood that those embodiments are merely used for illustrating the application, but not intended to limit the scope of the application.

Secondary batteries in embodiments 1 to 19 and contrast examples 1 to 6 are all prepared according to the following method.

(1) Preparation of a Positive Electrode Plate:

Mixing a positive active material LiNi0.8Co0.1Mn0.1O2, an adhesive polyvinylidene fluoride and a conductive additive, i.e., conductive carbon black, according to a weight ratio of 97:1:2, adding N-methyl pyrrolidone (NMP), and stirring in a vacuum stirrer until the system is changed into a transparent state, so as to obtain a positive electrode size; and transferring an aluminum foil to a drying oven to dry it after air-drying it at the room temperature, and putting the foil under cold pressing and slitting to obtain the positive electrode plate.

(2) Preparation of a Negative Electrode Plate:

Mixing negative active materials of silicon monoxide and artificial graphite according to a mass ratio of 2:8, mixing the mixture with a conductive additive Super P, a thickener sodium carboxymethylcellulose (CMC-Na), an adhesive styrene butadiene rubber (SBR) according to a mass ratio of 92:2:2:4, adding deionized water, and stirring in the vacuum stirrer to obtain a negative electrode size uniformly dispersed; and transferring a copper foil to the drying oven to dry it after air-drying it at the room temperature, and putting it under cold pressing and slitting to obtain the negative electrode plate.

(3) Preparation of an Electrolyte:

In a high-purity nitrogen glovebox, mixing organic solvents to obtain a mixed solvent, then dissolving sufficiently dried electrolyte salt in the mixed solvent, then adding additives into the mixed solvent, and performing uniform mixing to obtain the electrolyte, wherein composition of the additives is that: 8% FEC+0.5% SA+0.5% TMSP, and content of each additive is a weight percent calculated on the basis of a total weight of the electrolyte; and certainly, those skilled in the art can also adopt additives with other composition for replacement, with no influence an overall performance test result of the application, wherein types and concentration of the electrolyte salt used in the electrolyte and specific types and content of the organic solvents are as shown in Table 1. Content of each organic solvent is a weight percent calculated on the basis of a total weight of the organic solvents; and the concentration of each electrolyte salt is molarity in the electrolyte.

(4) Preparation of a Separation Film:

Specific settings of a base material in the separation film and thickness of the base material are as shown in FIG. 1.

(5) Preparation of the Secondary Battery:

Stacking the positive electrode plate, the separation film and the negative electrode plate in sequence, positioning the separation film between the positive and negative electrode plates for separation, and then winding to obtain an electrode assembly; and placing the electrode assembly in an outer package, injecting the prepared electrolyte into a dried battery, and performing vacuum packaging, standing, formation, shaping and the like to obtain the secondary battery.

TABLE 1

Parameters of Embodiments 1-9 and Contrast Examples 1-6

| | | | | | Electrolyte Salt | Separation Film | |
|---|---|---|---|---|---|---|---|
| Sequence Number | Organic Solvents | | | | Type and Concentration of Electrolyte Salt | Type of Base Material | Thickness of Base Material/μm |
| | EC | EMC | DEC | DMC | | | |
| Embodiment 1 | 20 | 60 | 20 | / | LiPF$_6$: 1.3 mol/L | polyethylene film | 9 |
| Embodiment 2 | 15 | 65 | 20 | / | LiPF$_6$: 1.3 mol/L | polyethylene film | 9 |
| Embodiment 3 | 10 | 70 | 20 | / | LiPF$_6$: 1.3 mol/L | polyethylene film | 9 |
| Embodiment 4 | 5 | 75 | 20 | / | LiPF$_6$: 1.3 mol/L | polyethylene film | 9 |
| Embodiment 5 | 10 | 75 | 15 | / | LiPF$_6$: 1.3 mol/L | polyethylene film | 9 |
| Embodiment 6 | 5 | 85 | 10 | / | LiPF$_6$: 1.3 mol/L | polyethylene film | 9 |
| Embodiment 7 | 10 | 90 | / | / | LiPF$_6$: 1.3 mol/L | polyethylene film | 9 |
| Embodiment 8 | 5 | 95 | / | / | LiPF$_6$: 1.3 mol/L | polyethylene film | 9 |
| Embodiment 9 | 10 | 75 | / | 15 | LiPF$_6$: 1.3 mol/L | polyethylene film | 9 |
| Embodiment 10 | 5 | 85 | / | 10 | LiPF$_6$: 1.3 mol/L | polyethylene film | 9 |
| Embodiment 11 | 5 | 95 | / | / | LiPF$_6$: 1.3 mol/L | polyethylene film | 7.0 |
| Embodiment 12 | 5 | 95 | / | / | LiPF$_6$: 1.3 mol/L | polyethylene film | 8.0 |
| Embodiment 13 | 5 | 95 | / | / | LiPF$_6$: 1.3 mol/L | polyethylene film | 10.0 |
| Embodiment 14 | 5 | 95 | / | / | LiPF$_6$: 1.3 mol/L | polyethylene film | 12.0 |
| Embodiment 15 | 5 | 95 | / | / | LiPF$_6$ (0.1 mol/L) + LiFSI (1.2 mol/L) | polyethylene film | 9 |
| Embodiment 16 | 5 | 95 | / | / | LiPF$_6$ (0.2 mol/L) + LiFSI (1.1 mol/L) | polyethylene film | 9 |
| Embodiment 17 | 5 | 95 | / | / | LiPF$_6$ (0.3 mol/L) + LiFSI (1.0 mol/L) | polyethylene film | 9 |
| Embodiment 18 | 5 | 95 | / | / | LiPF$_6$ (0.4 mol/L) + LiFSI (0.9 mol/L) | polyethylene film | 9 |
| Embodiment 19 | 5 | 95 | / | / | LiPF$_6$ (0.5 mol/L) + LiFSI (0.8 mol/L) | polyethylene film | 9 |
| Contrast Example 1 | 30 | 50 | 20 | / | LiPF$_6$: 1.3 mol/L | polyethylene film | 9 |
| Contrast Example 2 | 30 | 50 | / | 20 | LiPF$_6$: 1.3 mol/L | polyethylene film | 9 |
| Contrast Example 3 | 20 | 60 | 20 | / | LiPF$_6$: 1.3 mol/L | polyethylene film | 6 |

TABLE 1-continued

Parameters of Embodiments 1-9 and Contrast Examples 1-6

| Sequence Number | Organic Solvents | | | | Electrolyte Salt Type and Concentration of Electrolyte Salt | Separation Film | |
|---|---|---|---|---|---|---|---|
| | EC | EMC | DEC | DMC | | Type of Base Material | Thickness of Base Material/μm |
| Contrast Example 4 | 5 | 95 | / | / | LiPF$_6$: 1.3 mol/L | polyethylene film | 6 |
| Contrast Example 5 | 20 | 60 | 20 | / | LiPF$_6$: 1.3 mol/L | polyethylene film | 14 |
| Contrast Example 6 | 5 | 95 | / | / | LiPF$_6$: 1.3 mol/L | polyethylene film | 14 |

Then the testing process of the secondary battery is illustrated.

(1) High-Temperature Cycle Performance Test:

At 45° C., charging the secondary battery to a voltage of 4.25V with a constant current of 1C, then charging to a current of 0.05C with a constant voltage of 4.25V, standing for 5 minutes and then discharging to a voltage of 2.5V with the constant current of 1C; it is the first charge/discharge cycle of the secondary battery, and this discharge capacity is denoted as discharge capacity of the secondary battery after the first cycle. Circularly charging/discharging the secondary battery for 800 times according to the method to obtain the discharge capacity after 800 cycles.

A capacity retention ratio (%) of the secondary battery after 800 cycles at 45° C.=(the discharge capacity of the secondary battery after 800 cycles/the discharge capacity of the secondary battery after the first cycle)×100%.

(2) High-Temperature Storage Performance Test:

At 25° C., charging the secondary battery to a voltage of 4.25V with a constant current of 0.5C and then charging it to a current of 0.05C with the constant voltage of 4.25V, and testing volume of the secondary battery at the moment by a drainage method and denoting the volume as V1; and then placing the secondary battery into a calorstat at 60° C. and taking it out after storing for 30 days, and testing volume of the secondary battery at the moment and denoting the volume as V2.

Volume expansion ratio (%) after the secondary battery is stored for 30 days at 60° C.=[(V2−V1)/V1]×100%.

(3) Low-Temperature Direct Current Resistance Test:

At −20° C., charging the secondary battery to a voltage of 4.25V with a constant current of 1C, then charging it to a current of 0.05C with the constant voltage of 4.25V, standing for 5 minutes and then discharging for 30 minutes with a constant current of 1C(I1), and measuring voltage of the secondary battery after discharge and denoting the voltage as U1; changing the temperature to −20° C., standing for 2 h, then discharging the second battery for 30 s at a constant current of 0.36C(I2), measuring voltage of the secondary battery after discharge and denoting the voltage as U2; and Low-temperature direct current resistance DCR of the secondary battery=(U1−U2)/(I1−I2).

TABLE 2

Performance Test Results of Embodiment 1-19 and Contrast Examples 1-6

| Sequence Number | Capacity Retention Ratio (%) after the Secondary Battery is Cycled for 800 Times at 45° C. | Volume Expansion Ratio (%) after the Secondary Battery is Stored for 30 Days at 60° C. | DCR (mohm) at −20° C. |
|---|---|---|---|
| Embodiment 1 | 92.0% | 19.1% | 150.1 |
| Embodiment 2 | 91.5% | 16.1% | 151.4 |
| Embodiment 3 | 90.7% | 13.1% | 152.1 |
| Embodiment 4 | 90.6% | 10.7% | 152.3 |
| Embodiment 5 | 89.2% | 14.5% | 151.7 |
| Embodiment 6 | 87.1% | 12.4% | 149.3 |
| Embodiment 7 | 88.9% | 15.1% | 145.5 |
| Embodiment 8 | 89.9% | 13.1% | 144.4 |
| Embodiment 9 | 88.7% | 19.1% | 142.1 |
| Embodiment 10 | 86.2% | 17.9% | 142.4 |
| Embodiment 11 | 86.9% | 15.1% | 139.6 |
| Embodiment 12 | 87.1% | 14.4% | 141.7 |
| Embodiment 13 | 87.1% | 14.8% | 148.7 |
| Embodiment 14 | 84.9% | 15.2% | 152.8 |
| Embodiment 15 | 88.9% | 11.1% | 128.9 |
| Embodiment 16 | 91.6% | 10.5% | 129.9 |
| Embodiment 17 | 90.3% | 11.5% | 132.8 |
| Embodiment 18 | 90.2% | 12.6% | 135.7 |
| Embodiment 19 | 86.4% | 14.4% | 143.9 |
| Contrast Example 1 | 79.9% | 28.6% | 147.8 |
| Contrast Example 2 | 81.1% | 32.6% | 143.7 |
| Contrast Example 3 | 79.0% | 24.0% | 143.6 |
| Contrast Example 4 | 82.0% | 17.6% | 137.9 |
| Contrast Example 5 | 81.0% | 22.3% | 179.6 |
| Contrast Example 6 | 79.0% | 18.6% | 170.9 |

It can be seen from the test results as shown in Table 2 that: the secondary battery according to the embodiments of the application can have good high-temperature cycle performance, good high-temperature storage performance and low low-temperature direct current resistance.

In the embodiments 1 to 14, the content of the ethylene carbonate (EC) and the thickness of the base material of the separation film in the secondary battery are both within the scope given by the application, and the secondary battery can have good high-temperature cycle performance, good high-temperature storage performance, and low low-temperature direct current resistance. In the embodiments 15 to 19, when the electrolyte salt of the secondary battery simultaneously includes the lithium bisfluorosulfonimide (LiFSI) and the lithium hexafluorophosphate (LiPF$_6$) and conditions that the molarity of the lithium bisfluorosulfonimide (LiFSI) in the electrolyte is 0.8 mol/L~1.3 mol/L and the molarity of the lithium hexafluorophosphate (LiPF$_6$) in the electrolyte is 0.15 mol/L~0.4 mol/L, the performance of the secondary battery and particularly the high-temperature cycle performance and the low-temperature direct current resistance of the secondary battery are further improved.

Compared to the embodiments 1 to 19, the high-temperature cycle performance of the secondary batteries in the contrast examples is all relatively poor. In the secondary batteries of the contrast examples 1 to 2, the content of the ethylene carbonate (EC) is higher than 20%, and the high-temperature cycle and high-temperature storage performance of the secondary batteries is deteriorated; the thicknesses of the base materials of the separation films of the secondary batteries in the contrast examples 3 to 6 are greater than 12 μm or less than 7 μm, the high-temperature cycle performance of the secondary batteries is deteriorated, and the high-temperature storage performance and/or the low-temperature direct current resistance are partially deteriorated.

From the above, the application effectively overcomes various defects in the prior art and has high industry utilization value.

The foregoing embodiments merely exemplarily illustrate the principle and effects of the application, but are not intended to limit the application. Those skilled in the art can make modifications or changes to the embodiments without departure from the spirit and scope of the application. Therefore, all equivalent modifications or changes completed by those ordinarily skilled in the art without departure from the spirit and technical thoughts disclosed by the application still shall fall within the claims of the application.

What is claimed is:

1. A secondary battery, comprising:
   a negative electrode plate, including a negative current collector and a negative electrode film which is arranged on at least one surface of the negative current collector and includes a negative active material;
   a separation film, including a base material and a coating arranged on at least one surface of the base material; and
   an electrolyte, including an organic solvent,
   wherein the negative active material includes a silicon-based material and a carbon material;
   a thickness of the base material of the separation film is 7 μm~12 μm; and
   the organic solvent includes ethylene carbonate (EC) and a weight ratio of the ethylene carbonate (EC) in the organic solvent is ≤20%,
   wherein the electrolyte further includes electrolyte salt, and the electrolyte salt includes lithium bisfluorosulfonimide (LiFSI) and lithium hexafluorophosphate (LiPF$_6$); and
   molarity of the lithium bisfluorosulfonimide (LiFSI) in the electrolyte is 0.8 mol/L~1.3 mol/L, and molarity of the lithium hexafluorophosphate (LiPF$_6$) in the electrolyte is 0.15 mol/L~0.4 mol/L.

2. The secondary battery according to claim 1, wherein the weight ratio of the ethylene carbonate (EC) in the organic solvent is ≤15%.

3. The secondary battery according to claim 1, wherein the thickness of the base material of the separation film is 7 μm~10 μm.

4. The secondary battery according to claim 1, wherein a porosity of the separation film is 25%~50%.

5. The secondary battery according to claim 1, wherein the organic solvent further includes one or more of ethyl methyl carbonate (EMC), diethyl carbonate (DEC), and dimethyl carbonate (DMC).

6. The secondary battery according to claim 5, wherein a weight ratio of the ethyl methyl carbonate (EMC) in the organic solvent is 60%~95%.

7. The secondary battery according to claim 5, wherein a weight ratio of the diethyl carbonate (DEC) in the organic solvent is ≤30%.

8. The secondary battery according to claim 5, wherein a weight ratio of the dimethyl carbonate (DMC) in the organic solvent is ≤15%.

9. The secondary battery according to claim 8, wherein the molarity of the lithium bisfluorosulfonimide (LiFSI) in the electrolyte is 0.9 mol/L~1.2 mol/L, and the molarity of the lithium hexafluorophosphate (LiPF$_6$) in the electrolyte is 0.15 mol/L~0.3 mol/L.

10. The secondary battery according to claim 1, wherein electrical conductivity of the electrolyte at 25° C. is 6.5 mS/cm~9.5 mS/cm; and
   a viscosity of the electrolyte at 25° C. is 3.5 mPa·s~5.5 mPa·s.

11. The secondary battery according to claim 1, wherein a mass ratio of the silicon-based material in the negative active material is 15%~30%.

12. The secondary battery according to claim 1, wherein a thickness of the separation film is 12 μm~14 μm.

13. The secondary battery according to claim 1, further comprising a positive electrode plate, the positive electrode plate including a positive current collector and a positive electrode film which is arranged on at least one surface of the positive current collector and includes a positive active material, the positive active material including one or more of a lithium nickel cobalt manganese oxygen compound and a lithium nickel cobalt aluminum oxide.

14. A device, comprising the secondary battery according to claim 1.

* * * * *